June 9, 1942.   J. I. HAASE   2,285,922

TIRE-BUILDING MACHINERY

Filed June 14, 1940   2 Sheets-Sheet 1

Inventor
Jorgen I. Haase

Attorney

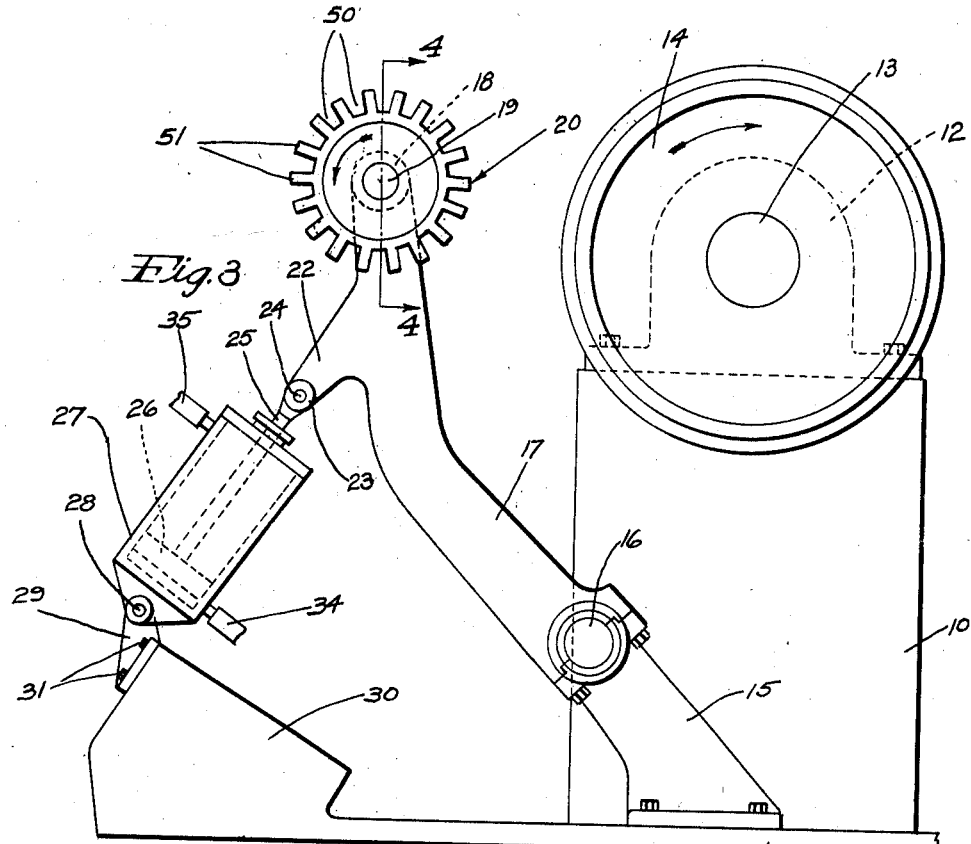
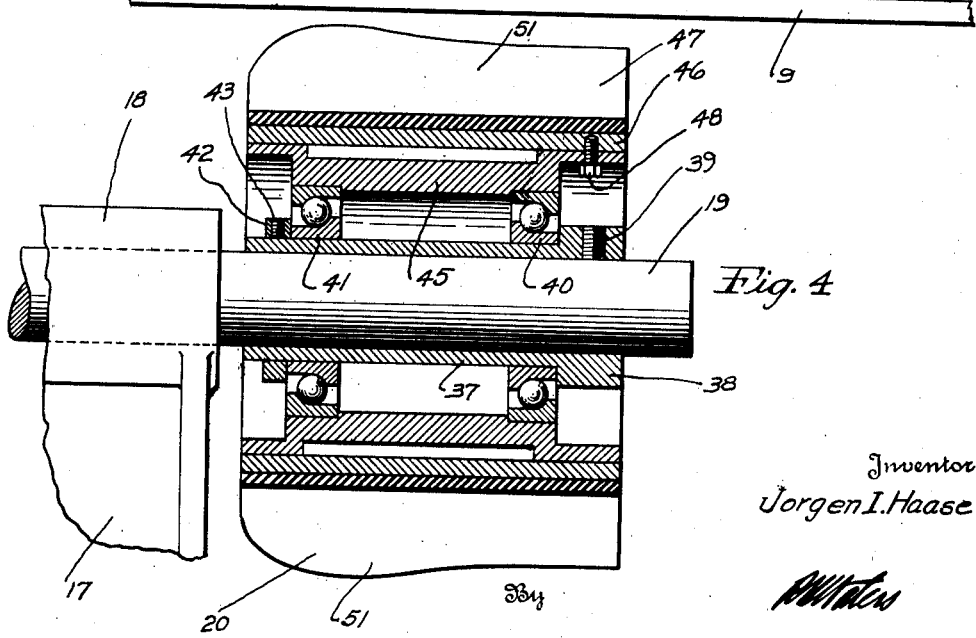

Patented June 9, 1942

2,285,922

UNITED STATES PATENT OFFICE 2,285,922

TIRE-BUILDING MACHINERY

Jörgen I. Haase, Akron, Ohio, assignor to Wingfoot Corporation, Wilmington, Del., a corporation of Delaware Application June 14, 1940, Serial No. 340,508

7 Claims. (Cl. 154—9)

This invention relates to tire building apparatus of the type used for building tire casings in flat band form, and it refers more especially to that portion of the apparatus by which the sidewall and tread portions of a tire are rolled or patted into adhesive relationship with the fabric body or carcass of the tire casing.

An object of this invention is to provide fluted rubber rollers or stitchers for applying the tread and sidewall stock to a fabric carcass in an efficient manner, to effect an even distribution of the plastic uncured rubber stock around the circumference of the tire, and also to eliminate the possibilty of air being trapped beneath the sidewall stock.

Another object is to pat or brush the uncured plastic sidewall stock circumferentially so that a good adhesive relationship is established before the conventional surface stitchers engage the stock to stitch it down in the usual manner.

These and other objects and advantages will be apparent from the following description when taken in connection with the accompanying drawings, wherein one form of the invention is shown merely by way of illustration, and wherein Fig. 1 is a side elevation of a tire building machine embodying the invention and showing the rollers in operative position;

Fig. 3 is a side elevation showing the rollers in inoperative position; and

Fig. 4 is a sectional view taken on the line 4—4 of Fig. 3.

Figure 1:
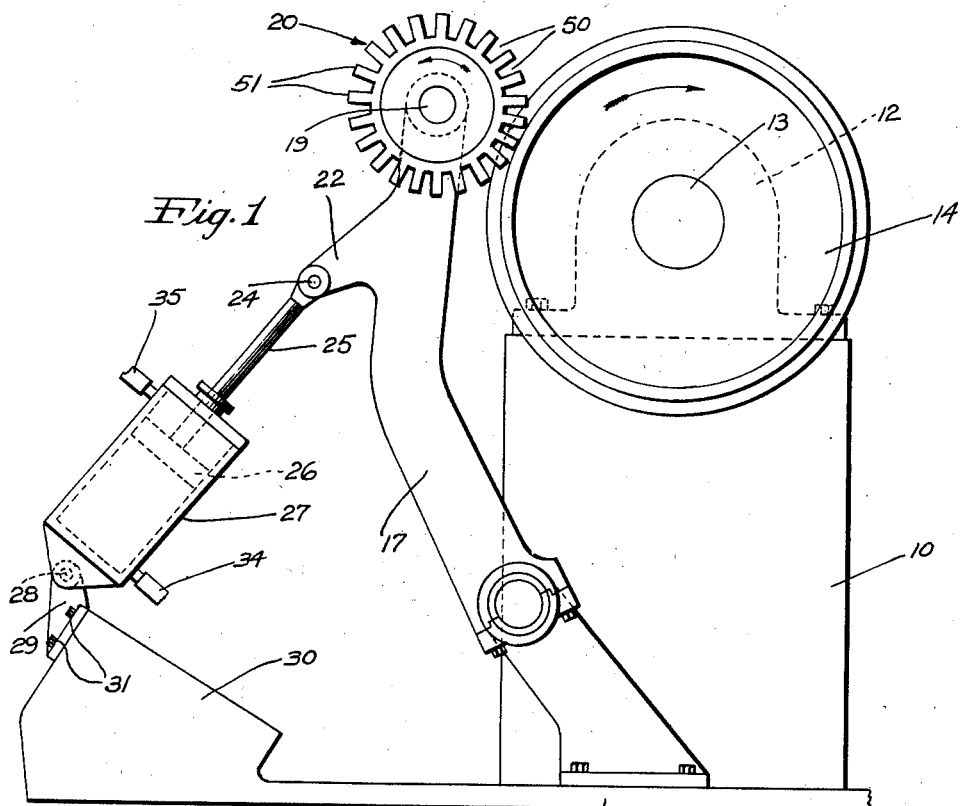

The tire building machine shown in the drawings comprises a base plate 9 upon which is mounted a pedestal 10, having on its upper surface a pair of bearings 12 which support a shaft 13 for mounting a drum 14. The shaft 13 is driven by a motor (not shown) whereby to turn the drum 14 in the direction indicated by the arrow in Fig. 1. Also disposed upon the base plate 9 are two bearings 15 supporting a shaft 16. Between these bearings 15, a bracket 17 is mounted for rocking movement on the shaft 16. The upper end of the bracket 17 terminates in a boss 18 which receives a shaft 19, on each of which is mounted in outboard fashion a resilient patter or stitching roll indicated generally by the numeral 20. Angularly extending from the bracket 17 a bifurcated lug 22 terminates in bosses 23 which receive a pin 24 for connection of a piston rod 25. At the opposite end of the piston rod 25 a piston 26 is attached for operation within an air cylinder 27 which is also pivoted at 28 in a bearing bracket 29 which in turn is attached by cap screws 31 to a raised portion 30 of the bed plate 9. Fluid pressure, such as compressed air, is admitted to the cylinder through flexible conductors 34 and 35. By admitting fluid under pressure through the conductor 34 the flexible rollers 20 will be moved to operative position against the tire-building drum (see Fig. 1), and when fluid is admitted through the conductor 35 the rollers be returned to inoperative position (see Fig. 3). These movements are brought about either manually or automatically by proper cams, valves and timing arrangements not shown but of well understood form.

Each resilient fluted patter roll or stitcher comprises an inner sleeve 37 provided with a flange 38 at its outer end through which a set screw 39 secures the sleeve 37 to the shaft 19. The flange 38 also serves to keep a ball bearing 40 in alinement. Mounted near the other end of the sleeve 37 is another ball bearing 41 which is held in alinement by a collar 42 and set screw 43. Mounted to rotate on these ball bearings is an outer collar or spider 45 which in turn has mounted thereon a sleeve 46 to which is vulcanized the outer resilient covering 47. Different sizes and types of tires require that these resilient rollers be of various contours and for this reason these resilient rollers may be removed and others substituted by first removing a locking screw 48. The entire roller assembly may also be adjusted as to the distance between rollers, according to the size tire being built, by loosening the set screw 39 and sliding the assembly along the shaft 19 in the desired direction.

The outer resilient covering 47 which may be formed of rubber or the like has a circumferential surface in the form of radial flutes or grooves 50 and radial projections 51, the outer contours of which conform to that of the tire that is being assembled upon the revolving drum 14.

The tire carcass 53 is built up on the drum in the usual manner of several plies of fabric, and the usual beads, breaker strip and chafing strips. The tread and sidewall portions are then assembled and applied to the tire as a single unit, the tread or central portion 54 being rolled into position by a pressure roller not shown. The sidewall portions 55 are relatively thin and are in an uncured plastic state, and if stitched or rolled before a good adhesion with the fabric body is established there is a tendency for the material to wrinkle or ball up before the rollers or stitchers which causes an uneven distribution of the stock, and may allow air pockets to be formed thereunder, which would be detrimental to the tire during vulcanization. The purpose of the resilient patter rolls is to eliminate these hazards by causing a uniform preliminary adhesion to enable the conventional stitcher rollers to do their work in a more efficient manner. The tread portion being of thicker stock and consequently stiffer does not need the aid of patter rolls except at the outer edges where the stock tapers down to merge with the sidewall stock.

Figure 2:
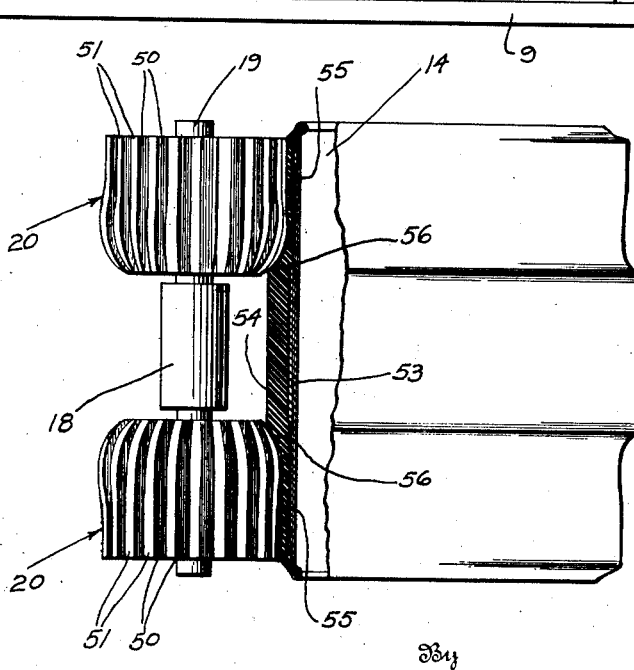
Fig. 2 is a top plan view of the same partly in section.

It will be noted (see Fig. 2) that the inner edge portions of the projections 51 of the patter rolls 20 are curved to coincide with the outer edges of the tread as at 56 and at these points the patter rolls are of less diameter than where they contact the sidewalls 55. Also at this point 56 the diameter of the tread is greater than that of the sidewall portions. By adjusting the patter rollers 20 toward one another it is evident that the curved surfaces of the patter rolls will contact the curved edges of the tread at 56 before they contact the sidewall stock resulting in greater frictional pressure being exerted at points 56 than on the sidewalls. Consequently rotation is imparted to the patter rolls and the rotational speed of the patter rolls is governed by such contact at 56. At these points the lesser diameter of the patter rolls contact the edges of the tread, and as said edges are of a greater diameter than the sidewalls they cause the patter rolls, where they contact the sidewalls, to travel at a greater surface speed than the surface speed of the sidewalls. This has the effect of the patter roll projections 51 progressively stepping or patting down the sidewall stock and at the same time provide a brushing or wiping action caused by the difference in surface speeds that will lay the sidewall in a firm and even adhesive relationship to the fabric carcass of the tire, after which the conventional surface stitches (not shown) will come into action and stitch down the sidewall stock in a more even and satisfactory manner.

This apparatus saves time and labor and produces more perfect tires. The patter rolls come into operation at the proper time automatically leaving the operator free for other duties which may be performed at the same time.

Although I have shown only one form of this apparatus by way of illustration it will be understood that various changes and modifications may be made without departing from the spirit of the invention.

I claim:

1. In a tire building machine having a power-driven building drum, a device for causing adhesion of uncured sidewall stock to the fabric carcass of a pneumatic tire on said drum, such device comprising a pair of rollers having their outer surfaces composed of resilient material characterized by radial projections and depressions, the outer contour of said projections being such as to conform with the contour of the tire casing, said rollers having their axes substantially parallel with that of the drum and being driven by frictional contact with said plastic stock on the tire casing while same is being assembled on the building drum to cause adhesion of the sidewall stock to the fabric carcass of the tire.

2. In a tire building machine of the class described, a device for causing adhesion of plastic uncured rubber sidewall stock to a fabric tire carcass, such device comprising a pair of resilient patter rolls in frictional engagement with said sidewall stock on said carcass in process of construction on a revolving drum, said rolls having their axes substantially parallel with that of the drum and having their outer surfaces composed of resilient material, and formed with radial grooves and projections, said projections being flexible to allow them to change their form or flex when in said frictional engagement, and the outer contour of the projections formed to substantially conform to said engaging stock of the tire casing with the point of frictional contact being greatest adjacent the smaller diameter of each patter roll, so that the surface speed of these portions of the rollers contacting the sidewall portions of the tire casing will be greater than the surface speed of said sidewall causing a brushing action on the sidewall stock.

3. In a tire building machine of the class described a device for causing an adhesive union of plastic uncured sidewall stock of a tire to the fabric carcass thereof, comprising resilient means in frictional line engagement with said plastic uncured stock, said resilient means being contoured to substantially the cross-sectional surface shape of the sidewall stock and being capable of changing its form or flexing both longitudinally and transversely when in such frictional line contact, and the surface speed of said resilient means being greater than the surface speed of the sidewall stock, to cause the sidewall stock to be brushed into adhesive relationship with the tire carcass.

4. In a tire building machine of the type described, a device for causing an adhesive union of plastic uncured sidewall stock of a tire to the fabric carcarss thereof, comprising a means which is positioned in frictional line contact with the plastic uncured sidewall stock, said means is provided with resilient ribs extending radially from its circumferential surface, the length of said ribs being substantially equal to the width of the sidewall stock, said ribs being capable of changing their form or flexing when in such frictional contact and the surface speed of the ribs which contact said sidewall portions being greater than the surface speed of part of the sidewall stock causing a tapping and brushing against the circumferential surface of the sidewalls to provide an adhesive relationship between the sidewalls and the tire carcass.

5. In a tire building machine of the class described a device for causing adhesion of the plastic uncured rubber sidewall stock to a pneumatic fabric tire carcass, comprising a rolling means in frictional contact with the tread and sidewall portions of a pneumatic tire casing, said rolling means being provided with resilient rubber ribs projecting radially and capable of patting and brushing the entire width of said sidewall stock into adhesive relationship with a pneumatic tire carcass.

6. In a tire building machine of the type described an apparatus for causing a primary union between the plastic uncured sidewalls and the fabric carcass of a pneumatic tire comprising a rotary rubber roller substantially parallel with the tire building drum and having resilient longitudinal ribs extending radially from the circumference thereof said longitudinal ribs being cable of changing their form and flexing when in frictional contact with the sidewall whereby the sidewalls are pressed and brushed into adhesive relation with the fabric carcass of a pneumatic tire.

7. In a tire building machine of the class described a device for causing a primary adhesion of plastic uncured rubber sidewall stock to a fabric tire carcass, comprising a pair of rubber patter rolls having resilient longitudinal ribs on its circumference, said ribs being capable of compressing and bending when brought into frictional contact with the plastic tread and sidewall portions of a tire casing, said rolls being so formed that the patting and brushing action takes place on the full width of the sidewall portions of a tire casing causing the plastic sidewalls to be evenly distributed around the circumference of the tire and in adhesive relationship thereto.

JÖRGEN I. HAASE.